US012803834B2

(12) United States Patent
Wang et al.

(10) Patent No.: US 12,803,834 B2
(45) Date of Patent: Nov. 17, 2026

(54) FEEDBACK STATE INDICATION METHOD AND APPARATUS, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Shukun Wang, Dongguan (CN); Teng Ma, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 282 days.

(21) Appl. No.: 18/601,214

(22) Filed: Mar. 11, 2024

(65) Prior Publication Data

US 2024/0214235 A1 Jun. 27, 2024

Related U.S. Application Data

(63) Continuation of application No. PCT/CN2021/136823, filed on Dec. 9, 2021.

(51) Int. Cl.
*H04L 12/18* (2006.01)
*H04L 1/1829* (2023.01)
*H04W 72/231* (2023.01)

(52) U.S. Cl.
CPC ........ *H04L 12/1868* (2013.01); *H04L 1/1854* (2013.01); *H04W 72/231* (2023.01)

(58) Field of Classification Search
CPC . H04L 12/1868; H04L 1/1854; H04L 1/1896; H04L 1/18; H04L 1/1864; H04W 72/231
USPC ................................ 370/329, 311, 318, 350
See application file for complete search history.

(56) References Cited

U.S. PATENT DOCUMENTS

| | | | | |
|---|---|---|---|---|
| 2021/0314098 | A1* | 10/2021 | Liu | H04W 72/23 |
| 2022/0131656 | A1* | 4/2022 | Lee | H04L 1/1825 |
| 2022/0132277 | A1* | 4/2022 | Shrivastava | H04W 76/28 |
| 2022/0279454 | A1* | 9/2022 | Papasakellariou | H04W 72/23 |

(Continued)

FOREIGN PATENT DOCUMENTS

| | | | |
|---|---|---|---|
| CN | 113632402 | A | 11/2021 |
| EP | 3975458 | A1 | 3/2022 |
| WO | 2021159466 | A1 | 8/2021 |

(Continued)

OTHER PUBLICATIONS

International Search Report in the International Application No. PCT/CN2021/136823, mailed on Aug. 5, 2022, with English translation provided by WIPO.

(Continued)

*Primary Examiner* — Ricardo H Castaneyra
(74) *Attorney, Agent, or Firm* — Ladas & Parry, LLP

(57) ABSTRACT

A feedback state indication method and apparatus, a terminal device and a network device are provided. The method includes: a terminal device receives RRC signaling sent by a network device, the RRC signaling carrying first indication information or second indication information. The first indication information is used for indicating that HARQ feedback is enabled or disabled, and the second indication information is used for indicating that the HARQ feedback is controlled by downlink control information to be enabled or disabled.

20 Claims, 8 Drawing Sheets

(56) References Cited

U.S. PATENT DOCUMENTS

2023/0063082 A1* 3/2023 Zhou .................... H04L 1/1851
2024/0106607 A1* 3/2024 Prasad .................. H04L 5/0053

FOREIGN PATENT DOCUMENTS

WO 2021217378 A1 11/2021
WO 2023102833 A1 6/2023

OTHER PUBLICATIONS

Written Opinion of the International Search Authority in the International Application No. PCT/CN2021/136823, mailed on Aug. 5, 2022, with English translation provided by WIPO.
Qualcomm Inc. "Views on UE feedback for Multicast RRC_CONNECTED UEs", 3GPP TSG RAN WG1 #107-e R1-2112240, Nov. 6, 2021, section 2.
SAMSUNG. "Power Saving and Scheduling Aspects for MBS", 3GPP TSG-RAN WG2 Meeting #116-e R2-2109517, Oct. 22, 2021, sections 1-2.
OPPO. "UL feedback for RRC-CONNECTED UEs in MBS", 3GPP TSG RAN WG1 #106bis-e R1-2109068, Oct. 1, 2021, sections 1-2.
Huawei, "New Work Item on NR support of Multicast and Broadcast Services", 3GPP TSG RAN Meeting #86 RP-193248, Dec. 9-12, 2019 (revision of RP-193163), the whole document, revised version.
Huawei, "New Work Item on NR support of Multicast and Broadcast Services", 3GPP TSG RAN Meeting #86 RP-193248, Dec. 9-12, 2019 (revision of RP-193163), the whole document, Clean version.
"3rd Generation Partnership Project; Technical Specification Group Radio Access Network; NR; Medium Access Control (MAC) protocol specification (Release 16)", 3GPP TS 38.321 V16.6.0 (Sep. 2021), Section 5.7.

* cited by examiner

FEEDBACK STATE INDICATION METHOD AND APPARATUS, TERMINAL DEVICE, AND NETWORK DEVICE

CROSS-REFERENCE TO RELATED APPLICATION

The present disclosure is a US continuation application of International Application No. PCT/CN2021/136823, filed on Dec. 9, 2021. The disclosure of the above application is hereby incorporated by reference in its entirety.

BACKGROUND

In the New Radio (NR) system, many scenarios need to support multicast and broadcast service requirements, such as the Internet of Vehicles and the Industrial Internet, etc. So it is necessary to introduce multicast and broadcast multimedia broadcast service (MBS) services into NR.

For multicast MBS services, Hybrid Automatic Repeat reQuest (HARQ) feedback is needed, and how to support HARQ feedback needs to be clear.

SUMMARY

Embodiments of the present disclosure relate to the technical field of mobile communication, and in particular to a method and apparatus for feedback state indication, a terminal device and a network device.

Embodiments of the present disclosure provide a method and apparatus for feedback state indication, a terminal device, a network device, a chip, a computer-readable storage medium, a computer program product, and a computer program.

A method for feedback state indication provided by an embodiment of the present disclosure, includes:

A terminal device receives a radio resource control (RRC) signaling sent by a network device, the RRC signaling carrying first indication information or second indication information, herein, The first indication information indicates whether a Hybrid Automatic Repeat reQuest (HARQ) feedback is enabled or disabled; and The second indication information indicates that whether the HARQ feedback is enabled or disabled is controlled by downlink control information (DCI).

A method for feedback state indication provided by an embodiment of the present disclosure, includes:

A network device sends a RRC signaling to a terminal device, the RRC signaling carrying first indication information or second indication information, herein, The first indication information indicates whether a HARQ feedback is enabled or disabled; and The second indication information indicates that whether the HARQ feedback is enabled or disabled is controlled by DCI.

An apparatus for feedback state indication provided by an embodiment of the present disclosure, which is applied in a terminal device, includes:

A receiving unit, which is configured to receive a RRC signaling sent by a network device, the RRC signaling carrying first indication information or second indication information, herein, The first indication information indicates whether a HARQ feedback is enabled or disabled; and The second indication information indicates that whether the HARQ feedback is enabled or disabled is controlled by DCI.

An apparatus for indicating a feedback state indication provided by an embodiment of the present disclosure, which is applied in a network device, includes:

A sending unit, which is configured to send a RRC signaling to a terminal device, the RRC signaling carrying first indication information or second indication information, herein, The first indication information indicates whether a HARQ feedback is enabled or disabled; and The second indication information indicates that whether the HARQ feedback is enabled or disabled is controlled by DCI.

A terminal device provided by an embodiment of the present disclosure includes a processor and a memory. The memory is used to store a computer program, and the processor is used to invoke and run the computer program stored in the memory to perform the above method for feedback state indication.

A network device provided by an embodiment of the present disclosure includes a processor and a memory. The memory is used to store a computer program, and the processor is used to invoke and run the computer program stored in the memory to perform the above method for feedback state indication.

A chip provided by an embodiment of the present disclosure is used to implement the above method for indicating the feedback state.

Specifically, the chip includes: a processor, used to invoke and run a computer program from a memory, causing a device on which the chip is installed to perform the above method for feedback state indication.

A computer-readable storage medium provided by an embodiment of the present disclosure is used to store a computer program, which causes a computer to perform the above method for indicating the feedback state.

A computer program product provided by an embodiment of the present disclosure includes computer program instructions, which cause a computer to perform the above method for feedback state indication.

A computer program provided by an embodiment of the present disclosure, when running on a computer, causes the computer to perform the above method for feedback state indication.

BRIEF DESCRIPTION OF THE DRAWINGS

The accompanying drawings illustrated herein are used to provide a further understanding of and constitute a part of the present disclosure, and the illustrative embodiments of the present disclosure and the description thereof are used to explain the present disclosure and do not constitute an undue limitation of the present disclosure. In the accompanying drawings.

DETAILED DESCRIPTION

The technical solution of embodiments of the present disclosure will be described in conjunction with the accompanying drawings in embodiments of the present disclosure below, and it will be obvious that the described embodiments are part of embodiments of the present disclosure, but not all of them. Based on embodiments in the present disclosure, all other embodiments obtained by those ordinarily skilled in the art without making creative efforts fall within the scope of protection of the present disclosure.

Figure 1:
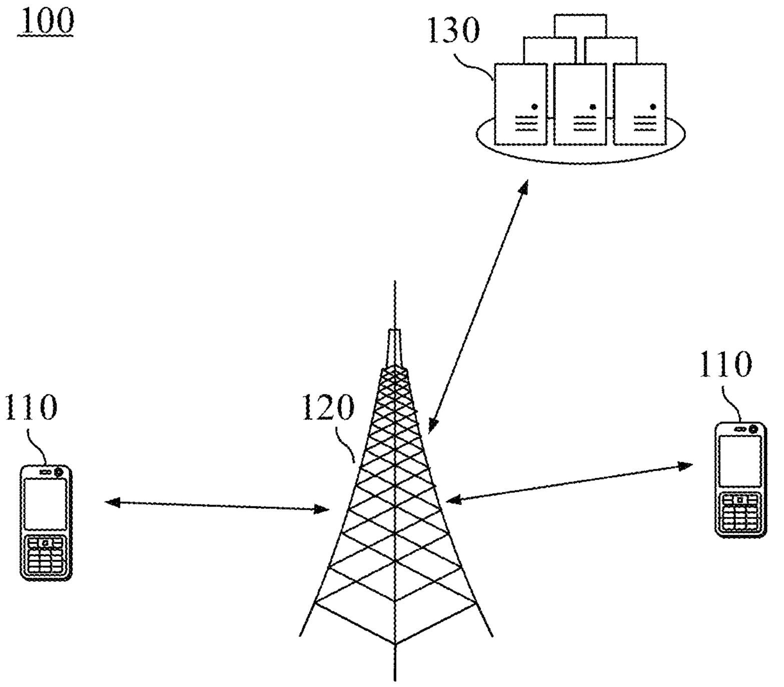
FIG. 1 is a schematic diagram of an application scenario of an embodiment of the present disclosure.

FIG. 1 is a schematic diagram of an application scenario of an embodiment of the present disclosure.

As shown in FIG. 1, a communication system 100 may include a terminal device 110 and a network device 120. The network device 120 may communicate with the terminal device 110 through an air interface. Multi-service transmission is supported between the terminal device 110 and the network device 120.

It should be understood that embodiments of the present disclosure are only illustrated by the communication system 100 as an example, but are not limited thereto. That is, the technical solution of embodiments of the present disclosure may be applied to various communication systems, such as: long term evolution (LTE) system, LTE time division duplex (TDD), universal mobile telecommunication System (UMTS), Internet of Things (IOT) system, narrow band Internet of Things (NB-IOT) system, enhanced machine-type communications (eMTC) system, 5G communication system (also referred to as NR communication system), or future communication system, etc.

In the communication system 100 shown in FIG. 1, the network device 120 may be an access network device that communicates with the terminal device 110. The access network device 110 may provide communication coverage for a particular geographic area and may communicate with a terminal device 110 (such as user equipment (UE)) located within the coverage area.

The network device 120 may be an evolutional base station in a LTE system (evolutional node B, eNB or eNodeB), or a next generation radio access network (NG RAN) device, or a base station in an NR system (gNB), or a wireless controller in a cloud radio access network (CRAN), or the network device 120 may be a relay station, an access point, a vehicle-mounted device, a wearable device, a hub, a switch, a bridge, a router, or a network device in a future evolved public land mobile network (PLMN), etc.

The terminal device 110 may be any terminal device including but not limited to a terminal device in wired or wireless connection with the network device 120 or other terminal devices.

For example, the terminal device 110 may refer to an access terminal, UE, a user unit, a user station, a mobile station, a remote station, a remote terminal, a mobile device, a user terminal, a terminal, a wireless communication device, a user agent, or a user device. The access terminal may be a cellular telephone, a cordless telephone, a session initiation protocol (SIP) telephone, an IoT device, a satellite handheld terminal, a wireless local loop (WLL) station, a personal digital assistant (PDA), a handheld device with wireless communication function, a computing device or other processing devices connected to a wireless modem, a vehicle-mounted device, a wearable device, a terminal device in the 5G network or a terminal device in the future evolved network, and the like.

The terminal device 110 may be used for device to device (D2D) communication.

The wireless communication system 100 may also include a core network device 130 that communicates with a base station, and the core network device 130 may be a 5G core (5GC) device, for example, an access and mobility management function (AMF), for another example, an authentication server function (AUSF), for another example, a user plane function (UPF), and for another example, a session management function (SMF). Optionally, the core network device 130 may also be an evolved packet core (EPC) device of the LTE network, for example, a device with session management function+core packet gateway (SMF+PGW-C). It should be understood that SMF+PGW-C may simultaneously achieve the functions that SMF and PGW-C can achieve. In the process of network evolution, the above core network device may also be referred to as other names, or a new network entity may be formed by dividing the functions of the core network, which is not limited by embodiments of the present disclosure.

Each functional unit in the communication system 100 may also establish a connection through a next generation (NG) interface to realize communication.

For example, the terminal device establishes an air interface connection with the access network device through the NR interface, for transmitting user plane data and control plane signaling. The terminal device may establish a control plane signaling connection with AMF through an NG interface 1 (N1 for short). The access network device such as a next generation radio access base station (gNB) may establish a user plane data connection with a UPF through an NG interface 3 (N3 for short). The access network device may establish a control plane signaling connection with AMF through an NG interface 2 (N2 for short). UPF may establish a control plane signaling connection with SMF through an NG interface 4 (N4 for short). UPF may exchange user plane data with data network through an NG interface 6 (N6 for short). AMF may establish a control plane signaling connection with SMF through an NG interface 11 (N11 for short). SMF may establish a control plane signaling connection with PCF through an NG Interface 7 (N7 for short).

FIG. 1 exemplarily illustrates a base station, a core network device and two terminal devices. In an example, the wireless communication system 100 may include multiple base station devices, and other numbers of terminal devices may be included within the coverage area of each base station, which is not limited by embodiments of the present disclosure.

It should be noted that FIG. 1 only illustrates the system to which the present disclosure applies by way of example, and of course the method shown in embodiments of the present disclosure may also be applicable to other systems. In addition, the terms "system" and "network" are often used interchangeably in the present disclosure. The term "and/or" in the present disclosure is only an association relationship describing associated objects and represents that three relationships may exist. For example, A and/or B may represent three conditions: i.e., independent existence of A, existence of both A and B and independent existence of B. In addition, character "/" in the present disclosure usually represents that previous and next associated objects form an "or" relationship. It should also be understood that the reference to "indication" in embodiments of the present disclosure may be a direct indication, may be an indirect indication, or may be indicative of an association. For example, A indicates B, which can mean that A directly indicates B, for example, B can be obtained through A. It can also mean that A indirectly indicates B, for example, A indicates C, and B can be obtained through C. It can also mean that there is an association between A and B. It should also be understood that in embodiments of the present disclosure, "correspond" may mean that there is a direct correspondence or an indirect correspondence relationship between the two, may also mean that there is an association relationship between the two, may also be a relationship between indication and being indicated, configuration and being configured, etc. It should also be understood that in embodiments of the present disclosure, "predefined" or "predefined rules" may be achieved by pre-storing corresponding codes, tables or other means that may be used to indicate relevant information in devices (e.g., including terminal devices and network devices), and the present disclosure does not limit the specific implementation thereof. For example, predefined may refer to being defined in the protocol. It should also be understood that in embodiments of the present disclosure, "protocol" may refer to standard protocols in the communication field, for example, may include LTE protocol, NR protocol and related protocols applied in future communication systems, which are not limited in the present disclosure.

In order to facilitate understanding of the technical solution of embodiments of the present disclosure, the following related arts of embodiments of the present disclosure are described. As an exemplary solution, the following related arts may be arbitrarily combined with the technical solution of embodiments of the present disclosure, and all of them belong to the protection scope of embodiments of the present disclosure.

With people's pursuit of speed, latency, high-speed mobility and energy efficiency, as well as the diversity and complexity of services in future life, the international standard organization of the 3rd generation partnership project (3GPP) began to develop 5G. The main application scenarios of 5G are: enhanced mobile broadband (eMBB), ultra-reliable low-latency communications (URLLC) and massive machine-type communications (mMTC).

On the one hand, eMBB still aims at users' access to multimedia content, services and data, and its demand is growing rapidly. On the other hand, since eMBB may be deployed in different scenarios, such as indoor, urban, rural, etc., and its capabilities and requirements are quite different, so it cannot be generalized and must be analyzed in detail in conjunction with specific deployment scenarios. Typical applications of URLLC include: industrial automation, power automation, telemedicine operation (surgery), traffic safety and so on. The typical characteristics of mMTC include: high connection density, small data volume, delay-insensitive services, low cost and long service life of modules.

MBMS

MBMS is a technology that transmits data from one data source to multiple terminal devices by sharing network resources. It can effectively utilize network resources while providing multimedia services, and realize broadcast and multicast of multimedia services with higher speed (such as 256 kbps).

Due to the low spectrum efficiency of MBMS, it is not enough to effectively carry and support the operation of mobile and TV type services. Therefore, in LTE, it is explicitly proposed in 3GPP to enhance the support capability for downlink high-speed MBMS services, and determine the design requirements for physical layer and air interface.

In 3GPP R9, evolved MBMS (eMBMS) is introduced into LTE. eMBMS is proposed with the concept of single frequency network (SFN), that is, multimedia broadcast multicast service single frequency network (MBSFN). MBSFN uses a unified frequency to send service data in all cells at the same time, but it needs to ensure the synchronization between cells. This mode may greatly improve the overall signal-to-noise ratio distribution of the cell, and the spectrum efficiency will be greatly improved accordingly. eMBMS achieves broadcast and multicast of services based on IP multicast protocol.

In LTE or LTE-Advanced (LTE-A), MBMS only has broadcast bearer mode, but does not have multicast bearer mode. In addition, the reception of MBMS service is applicable to the terminal device in an idle state or a connected state.

The concept of single cell point to multipoint (SC-PTM) is introduced in 3GPP R13. SC-PTM is based on MBMS network architecture.

New logical channels are introduced by MBMS, including single cell-multicast control channel (SC-MCCH) and single cell-multicast transport channel (SC-MTCH). SC-MCCH and SC-MTCH are mapped onto a downlink-shared channel (DL-SCH), and further, DL-SCH is mapped onto physical downlink shared channel (PDSCH), herein SC-MCCH and SC-MTCH are logical channels, DL-SCH is transmission channel, and PDSCH is physical channel. SC-MCCH and SC-MTCH do not support Hybrid Automatic Repeat reQuest (HARQ) operations.

A new system information block (SIB) type, i.e. SIB20 is introduced by MBMS. Specifically, configuration information of the SC-MCCH is transmitted through SIB 20, and there is only one SC-MCCH per cell. The configuration information of SC-MCCH includes: a modification period of SC-MCCH, a repetition period of SC-MCCH, and a radio frame and subframe of scheduling SC-MCCH, etc. Further, 1) a boundary of the modification period of SC-MCCH satisfies SFN mod m=0, herein SFN represents a system frame number of the boundary, and m is the modification period of SC-MCCH configured in SIB20 (i.e. sc-mcch-ModificationPeriod). 2) The radio frame of the scheduling SC-MCCH satisfies: SFN mod mcch-RepetitionPeriod=mcch-Offset, herein, SFN represents a system frame number of the radio frame, mcch-RepetitionPeriod represents the repetition period of SC-MCCH, and mcch-Offset represents an offset of SC-MCCH. 3) The subframe of the scheduling SC-MCCH is indicated by sc-mcch-Subframe.

SC-MCCH is scheduled through Physical Downlink Control Channel (PDCCH). On the one hand, a new radio network temporary Identity (RNTI), i.e. single cell RNTI (SC-RNTI), is introduced to identify PDCCH for scheduling SC-MCCH (such as SC-MCCH PDCCH), and optionally, a fixed value of SC-RNTI is FFFC. On the other hand, a new RNTI, i.e. single cell notification RNTI (SC-N-RNTI), is introduced to identify PDCCH for indicating change notification of SC-MCCH (e.g. notification PDCCH), and optionally, a fixed value of SC-N-RNTI is FFFB. Further, a change notification may be indicated by one of eight bits of DCI IC. In LTE, the configuration information of SC-PTM is based on SC-MCCH configured by SIB20, and then SC-MCCH configures SC-MTCH for transmitting service data.

Specifically, SC-MCCH transmits only one message (i.e., SCPTMConfiguration), which is used to configure the configuration information of SC-PTM. The configuration information of SC-PTM includes: temporary mobile group identity (TMGI), session id, group RNTI (G-RNTI), discontinuous reception (DRX) configuration information and SC-PTM service information of adjacent areas. It should be noted that SC-PTM in R13 does not support a robust header compression (ROHC) function.

Downlink discontinuous reception of SC-PTM is controlled by the following parameters: onDuration TimerSCPTM, drx-Inactivity TimerSCPTM, SC-MTCH-SchedulingCycle, and SC-MTCH-SchedulingOffset.

When [(SFN*10)+subframe number] modulo (SC-MTCH-SchedulingCycle)=SC-MTCH-SchedulingOffset is met, a timer onDurationTimerSCPTM is started;

When the downlink PDCCH scheduling is received, a timer drx-Inactivity TimerSCPTM is started; and Only when the timer onDurationTimerSCPTM or drx-InactivityTimerSCPTM is operated, downlink SC-PTM services are received.

SC-PTM service continuity adopts the concept of SIB 15 based MBMS service continuity, that is, a "SIB15+MBMSInterestIndication" mode. Service continuity of a terminal device in an idle state is based on the concept of frequency priority.

In the technical solution of embodiments of the present disclosure, a new SIB is defined (referred to as a first SIB), the first SIB includes the configuration information of a first MCCH. Herein, the first MCCH is the control channel of the MBMS service, in other words, the first SIB is used to configure the configuration information of the control channel of NR MBMS, and optionally, the control channel of NR MBMS may also be referred to as NR MCCH (i.e. the first MCCH).

Further, the first MCCH is used to carry a first signaling, and embodiments of the present disclosure do not limit the name of the first signaling, such as the first signaling is signaling A, and the first signaling includes configuration information of at least one first MTCH, here the first MTCH is a service channel of MBMS service (also referred to as data channel or transmission channel), and the first MTCH is used to transmit MBMS service data (such as NR MBMS service data). In other words, the first MCCH is used to configure the configuration information of the service channel of NR MBMS, and optionally, the service channel of NR MBMS may also be referred to as NR MTCH (i.e. said first MTCH).

Specifically, the first signaling is used to configure the service channel of NR MBMS, the service information corresponding to this service channel, and the scheduling information corresponding to this service channel. Furthermore, optionally, the service information corresponding to the service channel is identity information of identity services, such as TMGI, session id, etc. The scheduling information corresponding to the service channel is such as RNTI used when MBMS service data corresponding to the service channel is scheduled, such as G-RNTI, DRX configuration information, etc.

It should be noted that the transmission of the first MCCH and the transmission of the first MTCH are both based on PDCCH scheduling. Herein, the RNTI used by PDCCH for scheduling the first MCCH uses a unique identifier across the entire network, i.e. a fixed value. RNTI used by PDCCH for scheduling the first MTCH is configured through the first MCCH.

It should be noted that embodiments of the present disclosure do not impose any restrictions on the naming of the first SIB, the first MCCH, and the first MTCH. For ease of description, the first SIB may also be referred to as SIB for short, the first MCCH may also be referred to as MCCH for short, and the first MTCH may also be referred to as MTCH for short. PDCCH for scheduling MCCH (i.e. MCCH PDCCH) is configured and PDCCH is notified through SIB, here the DCI carried by MCCH PDCCH schedules PDSCH for transmitting MCCH (i.e. MCCH PDSCH). Further, M pieces of PDCCHs for scheduling MTCH (i.e. MTCH 1 PDCCH, MTCH 2 PDCCH, . . . , MTCH M PDCCH) are configured through MCCH, here the DCI carried by MTCH n PDCCH schedules PDSCH for transmitting MTCH n (i.e. MTCH n PDSCH), and n is an integer greater than or equal to 1 and less than or equal to M. MCCH and MTCH are mapped onto DL-SCH, and further, DL-SCH is mapped onto PDSCH, here MCCH and MTCH are logical channels, DL-SCH is transmission channel, and PDSCH is physical channel.

It should be noted that although the above solution is illustrated taking MBMS as an example, the description of "MBMS" may also be replaced with "MBS". Embodiments of the present disclosure are illustrated taking MBS as an example, and the description of "MBS" may also be replaced with "MBMS".

In the NR system, many scenarios need to support multicast and broadcast service requirements, such as the Internet of Vehicles and the Industrial Internet, etc. So it is necessary to introduce multicast and broadcast MBS services in NR. It should be noted that multicast MBS services refer to MBS services transmitted through the multicast mode. The broadcast MBS services refer to MBS services transmitted through the broadcast mode.

Figure 2:
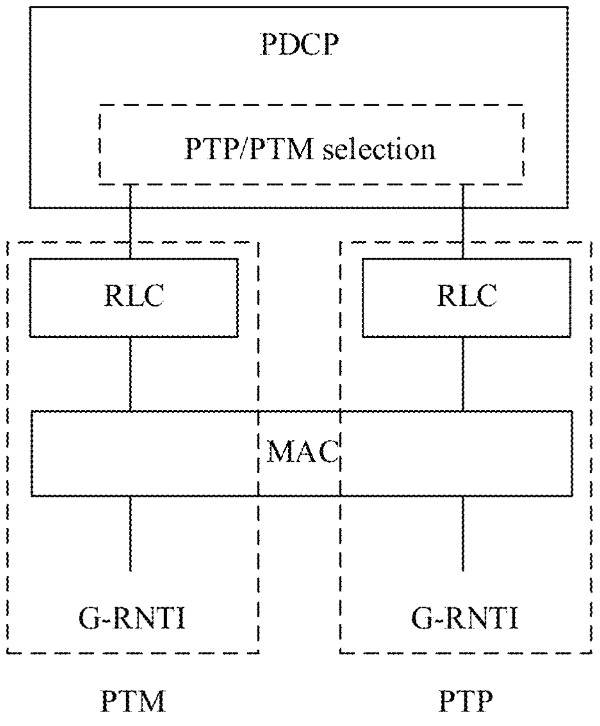
FIG. 2 is a schematic diagram of a protocol stack corresponding to a PTM mode and a PTP mode of an embodiment of the present disclosure.

In the NR system, for multicast MBS services, MBS services are sent to all terminal devices in a certain group. The terminal device receives multicast MBS services in a RRC connection state, and may receive multicast MBS service data through point-to-multipoint (PTM) mode or point-to-point (PTP) mode. Here, referring to FIG. 2, the MBS service data of PTM mode scrambles the corresponding scheduling information through G-RNTI configured on the network side, while the MBS service data of PTP mode scrambles the corresponding scheduling information through C-RNTI.

For multicast MBS services, after receiving MBS services from the core network through a shared tunnel, the base station may deliver the MBS services to all terminal devices in a group through an air interface. Here, the base station may deliver MBS services to all terminal devices in a group through PTP mode and/or PTM mode. For example, a group includes terminal device 1, terminal device 2, and terminal device 3. The base station may deliver MBS services to terminal device 1 through PTP mode, deliver MBS services to terminal device 2 through PTP mode, and deliver MBS services to terminal device 3 through PTP mode. Alternatively, the base station may deliver MBS services to terminal device 1 through PTP mode, and deliver MBS services to terminal devices 2 and 3 through PTM mode. Alternatively, the base station may deliver MBS services to terminal devices 1, 2, and 3 through PTM mode. A shared GTP tunnel is used between the core network and the base station to transmit MBS services, which means that both MBS services of PTM mode and MBS services of PTP mode share this GTP tunnel. The base station delivers MBS service data to UE1 and UE2 in PTM mode, and delivers MBS service data to UE3 in PTP mode.

For multicast MBS services (referred to as MBS multicast services), the DRX mechanism has been introduced to save energy for terminal devices. For the sake of distinction, the DRX used for MBS multicast service reception is referred to as MBS DRX (or multicast DRX), and the DRX used for traditional unicast service reception is referred to as unicast DRX. MBS DRX and unicast DRX are independent of each other. As an example, the parameters related to MBS DRX may refer to Table 1 below. The network side may configure the parameters shown in Table 1 through the RRC signaling to control MBS DRX operations by those parameters. It should be noted that MBS DRX is configured per G-RNTI or per G-CS-RNTI. For a terminal device, DRX activation time includes the following running time of timers: drx-onDurationTimerPTM, drx-InactivityTimerPTM, and drx-Retransmission Timer-DL-PTM.

TABLE 1

| |
|---|
| drx-onDurationTimerPTM: the duration at the beginning of a DRX cycle; |
| drx-SlotOffsetPTM: the delay before starting the drx-onDurationTimerPTM; |
| drx-InactivityTimerPTM: the duration after the PDCCH occasion in which a PDCCH indicates a new DL multicast transmission for the MAC entity; |
| drx-LongCycleStartOffsetPTM: the long DRX cycle drx-LongCycle-PTM and drx-StartOffset-PTM which defines the subframe where the long DRX cycle starts; |
| drx-RetransmissionTimer-DL-PTM (per DL HARQ process for multicast MBS): the maximum duration until a DL multicast retransmission is received; |
| drx-HARQ-RTT-Timer-DL-PTM (per DL HARQ process for multicast MBS): the minimum duration before a DL multicast assignment for HARQ retransmission is expected by the MAC entity; |

On the one hand, during the transmission process of MBS services, there is a scenario where PTP is used for PTM retransmission, that is, a transport block (TB) of MBS services. The network side performs an initial transmission (referred to as initial transmission) by the PTM mode (i.e. scheduling information corresponding to G-RNTI scrambling), and if the terminal device receives a failure feedback negative acknowledgement (NACK), then the network side performs a repeat transmission (retransmission for short) through the PTP mode (i.e. scheduling information corresponding to C-RNTI scrambling). At this point, the initial transmission of the PTM mode and the retransmission of the PTP mode correspond to the same HARQ process identifier and a new data indication (NDI), that is, the HARQ process identifier and NDI carried in the scheduling signal of the initial transmission are the same as the HARQ process identifier and NDI carried in the scheduling signal of the retransmission.

On the other hand, during the transmission process of MBS services, there is a HARQ feedback for the transmission in the PTM mode. HARQ feedback modes include a NACK only based HARQ feedback mode and a ACK/NACK based HARQ feedback mode. The feedback mode of MBS services may be configured through the RRC signaling, and it is configured per G-RNTI or per G-CS-RNTI. However, it is not yet clear how to support the HARQ feedback enable or disable. Therefore, the following technical solution of embodiments of the present disclosure is proposed. In the technical solution of embodiments of the present disclosure, it is indicated whether the HARQ feedback is enabled or disabled through the RRC signaling or DCI, further clarifying the influence of the HARQ feedback on the DRX operation when disabled.

In order to facilitate understanding of the technical solution of embodiments of the present disclosure, the technical solution of the present disclosure will be described in detail below by way of specific embodiments. As an optional solution, the above related technology may be arbitrarily combined with the technical solution of embodiments of the present disclosure, and all of them belong to the protection scope of embodiments of the present disclosure. Embodiments of the present disclosure include at least some of the following.

Through the technical solution of the present disclosure, it is clear that in the MBS service receiving process, the HARQ feedback is semi-statically enabled or disabled by RRC signaling, or the HARQ feedback is dynamically enabled or disabled by DCI, so that the MBS service may well support the HARQ feedback.

Figure 3:
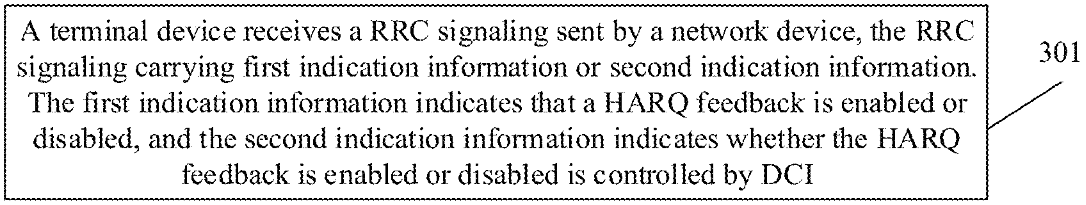
FIG. 3 is a flow diagram of a method for feedback state indication provided by an embodiment of the present disclosure.

FIG. 3 is a flow diagram of a method for feedback state indication provided by an embodiment of the present disclosure. As shown in FIG. 3, the method for feedback state indication includes the following steps:

In 301: a terminal device receives a RRC signaling sent by a network device, the RRC signaling carrying first indication information or second indication information. Herein the first indication information indicates that a HARQ feedback is enabled or disabled; and the second indication information indicates that whether the HARQ feedback is enabled or disabled is controlled by DCI.

In an embodiment of the present disclosure, the network configures configuration information of MBS service transmission for the terminal device through a RRC dedicated signaling, the configuration information includes for example TMGI, G-RNTI or G-CS-RNTI, common frequency domain positions for MBS reception, HARQ feedback mode, data transmission architecture, etc. Here, the HARQ feedback mode may be, for example, a NACK only based HARQ feedback mode, or an ACK/NACK based HARQ feedback mode. The data transmission mode may be, for example, the protocol stack mode of PDCP anchor, and the data architecture transmission mode of PTP for PTM retransmission.

It should be noted that the HARQ feedback mode in embodiments of the present application may be an NACK only based HARQ feedback mode, or may be an ACK/NACK based HARQ feedback mode. Either feedback mode is applicable to the technical solution of embodiments of the present disclosure.

In an embodiment of the present disclosure, the HARQ feedback mode may be configured per G-RNTI or per G-CS-RNTI. Here, the HARQ feedback mode is configured per G-RNTI, which may be understood as the HARQ feedback mode being configured according to G-RNTI, and the HARQ feedback mode being associated with G-RNTI.

The HARQ feedback mode is configured by group configuration scheduling radio network temporary identity (G-CS-RNTI), which may be understood as the HARQ feedback mode being configured according to G-CS-RNTI, and the HARQ feedback mode being associated with G-CS-RNTI. Here, G-RNTI is used for dynamic scheduling of MBS services, and G-CS-RNTI is used for semi persistent scheduling (SPS) of MBS services.

In an embodiment of the present disclosure, the network device sends the RRC signaling to the terminal device, and correspondingly, the terminal device receives the RRC signaling sent by the network device, the RRC signaling carrying the first indication information or the second indication information. Herein the first indication information indicates that a HARQ feedback is enabled or disabled; and the second indication information indicates that whether the HARQ feedback is enabled or disabled is controlled by DCI.

The technical solution of embodiments of the present disclosure is illustrated below in conjunction with the dynamic scheduling of MBS services and the semi persistent scheduling of MBS services.

The First Solution: Dynamic Scheduling

In some exemplary implementations, MBS services are dynamically scheduled, and correspondingly, the HARQ feedback of MBS services is the HARQ feedback corresponding to G-RNTI.

In some exemplary implementations, when the RRC signaling carries the first indication information and the first indication information indicates that the HARQ feedback is disabled, a DRX retransmission timer and a DRX RTT timer which are associated with the G-RNTI do not need to be configured.

In some exemplary implementations, when the RRC signaling carries the second indication information, or when the RRC signaling carries the first indication information and the first indication information indicates that the HARQ feedback is enabled, the DRX retransmission timer and the DRX RTT timer which are associated with the G-RNTI need to be configured.

Here, the DRX retransmission timer associated with G-RNTI is a retransmission timer used for MBS services, the DRX RTT timer associated with G-RNTI is a DRX RTT timer used for MBS services, and the MBS services are dynamically scheduled through G-RNTI. As an example, the DRX retransmission timer may be referred to as drx-RetransmissionTimer-DL-PTM, and the DRX RTT timer may be referred to as drx-HARQ-RTT-Timer-DL-PTM.

In some exemplary implementations, in case that the RRC signaling carries the second indication information, the network device sends DCI to the terminal device, and correspondingly, the terminal device receives the DCI sent by the network device, and the DCI is used to control whether a HARQ feedback is enabled or disabled. The following is an explanation of how the DCI controls whether the HARQ feedback is enabled or disabled.

Condition 1-1), the DCI is new transmission scheduling DCI scrambled by the G-RNTI, the new transmission scheduling DCI carries first indication information, and the first indication information is used for indicating whether the HARQ feedback is enabled or disabled.

In some exemplary implementations, a HARQ feedback state indicated by the first indication information in the new transmission scheduling DCI having correspondences and a HARQ feedback state indicated by first indication information in retransmission schedule DCI are the same.

In some exemplary implementations, the HARQ feedback state indicated by the first indication information in the new transmission scheduling DCI having correspondences and the HARQ feedback state indicated by the first indication information in the retransmission schedule DCI are different. As an example: the first indication information in the new transmission scheduling DCI indicates that the HARQ feedback is enabled, and the first indication information in the retransmission schedule DCI associated with the new transmission scheduling DCI indicates that the HARQ feedback is disabled.

In the above solution, there are correspondences between the new transmission scheduling DCI and the retransmission scheduling DCI. The correspondences are reflected in the fact that these two scheduling DCIs are for scheduling the same TB of the same HARQ process and these two scheduling DCIs carry the same HARQ process identifier.

Condition 1-2), the DCI is retransmission scheduling DCI scrambled by the G-RNTI, the retransmission scheduling DCI does not carry first indication information, and a HARQ feedback state corresponding to the retransmission scheduling DCI is determined based on first indication information in new transmission scheduling DCI associated with the retransmission scheduling DCI.

Condition 1-3), the DCI is retransmission scheduling DCI scrambled by the G-RNTI, the retransmission scheduling DCI carries first indication information, and the first indication information is used for indicating whether the HARQ feedback is enabled or disabled.

In some exemplary implementations, a HARQ feedback state indicated by the first indication information in the new transmission scheduling DCI having correspondences and a HARQ feedback state indicated by first indication information in retransmission schedule DCI are the same.

In some exemplary implementations, the HARQ feedback state indicated by the first indication information in the new transmission scheduling DCI and the first indication information is used and the HARQ feedback state indicated by the first indication information in the retransmission schedule DCI are different. As an example: the first indication information in the new transmission scheduling DCI indicates that the HARQ feedback is enabled, and the first indication information in the retransmission schedule DCI associated with the new transmission scheduling DCI indicates that the HARQ feedback is disabled.

In the above solution, there are correspondences between the new transmission scheduling DCI and the retransmission scheduling DCI. The correspondences are reflected in the fact that these two scheduling DCIs are for scheduling the same TB of the same HARQ process and these two scheduling DCIs carry the same HARQ process identifier.

It should be noted that the above solution of condition 1-1) may be combined with the above solution of condition 1-2) or the above solution of condition 1-3).

In an embodiment of the present disclosure, when the terminal device determines that the HARQ feedback is disabled, the terminal device stops or does not start the DRX RTT timer and the DRX retransmission timer which are associated with the G-RNTI.

In some exemplary implementations, MBS services are semi persistent scheduled, and correspondingly, the HARQ feedback of MBS services is the HARQ feedback corresponding to G-CS-RNTI.

The Second Solution: Semi Persistent Scheduling

In some exemplary implementations, when the RRC signaling carries the first indication information and the first indication information indicates that the HARQ feedback is disabled, a DRX retransmission timer and a DRX RTT timer that are associated with the G-CS-RNTI do not need to be configured.

In some exemplary implementations, when the RRC signaling carries the second indication information, or when the RRC signaling carries the first indication information and the first indication information indicates that the HARQ feedback is enabled, the DRX retransmission timer and the DRX RTT timer that are associated with the G-CS-RNTI need to be configured.

Here, the DRX retransmission timer associated with G-CS-RNTI is a retransmission timer used for MBS services, the DRX RTT timer associated with G-CS-RNTI is a DRX RTT timer used for MBS services, and the MBS services are semi persistent scheduled through G-CS-RNTI. As an example, the DRX retransmission timer may be referred to as drx-Retransmission Timer-DL-PTM, and the DRX RTT timer may be referred to as drx-HARQ-RTT-Timer-DL-PTM.

In some exemplary implementations, in case that the RRC signaling carries the second indication information, the network device sends DCI to the terminal device, and correspondingly, the terminal device receives the DCI sent by the network device, and the DCI is used to control whether a HARQ feedback is enabled or disabled. The following is an explanation of how the DCI controls whether the HARQ feedback is enabled or disabled.

Condition 2-1), the DCI is DCI for MBS SPS activation scrambled by the G-CS-RNTI, and the DCI for MBS SPS activation carries first indication information for indicating whether the HARQ feedback is enabled or disabled.

In some exemplary implementations, a HARQ feedback state indicated by the first indication information in the DCI for MBS SPS activation and a HARQ feedback state indicated by first indication information in retransmission schedule DCI are the same.

In some exemplary implementations, the HARQ feedback state indicated by the first indication information in the DCI for MBS SPS activation and the HARQ feedback state indicated by the first indication information in the retransmission schedule DCI are different. As an example: the first indication information in the DCI for MBS SPS activation indicates that the HARQ feedback is enabled, and the first indication information in the retransmission schedule DCI indicates that the HARQ feedback is disabled.

Condition 2-2), the DCI is retransmission scheduling DCI scrambled by the G-CS-RNTI, the retransmission scheduling DCI does not carry first indication information, and a HARQ feedback state corresponding to the retransmission scheduling DCI is determined based on first indication information in DCI for MBS SPS activation.

Condition 2-3), the DCI is retransmission scheduling DCI scrambled by the G-CS-RNTI, the retransmission scheduling DCI carries first indication information, and the first indication information is used for indicating whether the HARQ feedback is enabled or disabled.

In some exemplary implementations, a HARQ feedback state indicated by the first indication information in the DCI for MBS SPS activation and a HARQ feedback state indicated by first indication information in retransmission schedule DCI are the same.

In some exemplary implementations, the HARQ feedback state indicated by the first indication information in the DCI for MBS SPS activation and the HARQ feedback state indicated by the first indication information in the retransmission schedule DCI are different. As an example: the first indication information in the DCI for MBS SPS activation indicates that the HARQ feedback is enabled, and the first indication information in the retransmission schedule DCI indicates that the HARQ feedback is disabled.

It should be noted that the above solution of condition 2-1) may be combined with the above solution of condition 2-2) or the above solution of condition 2-3).

In an embodiment of the present disclosure, when the terminal device determines that the HARQ feedback is disabled, the terminal device stops or does not start the DRX RTT timer and the DRX retransmission timer that re associated with the G-CS-RNTI.

The technical solution of embodiments of the present disclosure is illustrated by example below in conjunction with specific application examples.

The First Application Example

1. The network configures configuration information for MBS service transmission for the terminal device through a RRC signaling, the configuration information includes for example TMGI, G-RNTI, common frequency domain positions for MBS reception, HARQ feedback mode, data transmission architecture, etc. Here, the HARQ feedback mode may be, for example, a NACK only based HARQ feedback mode, or an ACK/NACK based HARQ feedback mode. The data transmission mode may be, for example, the protocol stack mode of PDCP anchor, and the data architecture transmission mode of PTP for PTM retransmission.

2. If the network configures a HARQ feedback corresponding to a certain G-RNTI to be disabled through the RRC signaling (i.e. the RRC signaling carries the first indication information, and the first indication information indicates that the HARQ feedback corresponding to G-RNTI is disabled), then the DRX retransmission timer and DRX RTT timer in the DRX parameter configuration which are associated with the G-RNTI are not configured.

If the network configures, through the RRC signaling, a HARQ feedback enabled/disabled (HARQ enable/disable) corresponding to a certain G-RNTI to be controlled through DCI (i.e. the RRC signaling carries the second indication information, and the second indication information indicates that whether the HARQ feedback is enabled or disabled is controlled by the DCI), then the DRX retransmission timer and the DRX RTT timer in the DRX parameter configuration which are associated with the G-RNTI need to be configured.

3. In case that the network configures, through the RRC signaling, that a HARQ enable/disable corresponding to a certain G-RNTI is controlled by the DCI, the terminal device receives the DCI.

Option 1: if the DCI schedules new transmission, i.e. NDI flipping, then the DCI carries the HARQ enable/disable indication information (i.e. the first indication information). If the DCI schedules retransmission, then the DCI does not carry the HARQ enable/disable indication information. By default, the HARQ enable/disable indication information given by the DCI corresponding to retransmission and that corresponding to the new transmission associated with the retransmission are the same.

Option 2: both new transmission scheduling DCI and retransmission scheduling DCI carry the HARQ enable/disable indication information. The HARQ enable/disable indication information given in the new transmission scheduling DCI and that given in the retransmission scheduling DCI for the same TB for the same HARQ indicate the same content. For example, the HARQ enable/disable indication information in the new transmission scheduling DCI and that in the retransmission scheduling DCI both indicate that the HARQ feedback is enabled.

Option 3: both new transmission scheduling DCI and retransmission scheduling DCI carry the HARQ enable/disable indication information. If the HARQ enable/disable indication information in the new transmission scheduling DCI indicates that the HARQ feedback is enabled, then the HARQ enable/disable indication information in the retransmission scheduling DCI associated with the new transmission scheduling DCI indicates that the HARQ feedback is disabled.

4. If the DCI indicates that the HARQ feedback is disabled, then: 1) in case that the DRX retransmission timer and the DRX RTT timer run, the terminal device stops the DRX retransmission timer and the DRX RTT timer; or, 2) in case that the DRX retransmission timer and the DRX RTT timer do not run, the terminal device does not start the DRX retransmission timer and the DRX RTT timer. Here, the DRX retransmission timer and the DRX RTT timer refer to the retransmission timer and RTT timer that are associated with the above G-RNTI.

The Second Application Example

1. The network configures configuration information for MBS service transmission for the terminal device through the RRC signaling, the configuration information includes for example TMGI, MBS SPS, G-CS-RNTI, common frequency domain positions for MBS reception, HARQ feedback mode, data transmission architecture, etc. Here, the HARQ feedback mode may be, for example, a NACK only based HARQ feedback mode, or an ACK/NACK based HARQ feedback mode. The data transmission mode may be, for example, the protocol stack mode of PDCP anchor, and the data architecture transmission mode of PTP for PTM retransmission.

2. If the network configures a HARQ feedback corresponding to a certain G-CS-RNTI to be disabled through the RRC signaling (i.e. the RRC signaling carries the first indication information, and the first indication information indicates that the HARQ feedback corresponding to G-CS-RNTI is disabled), then the DRX retransmission timer and DRX RTT timer in the DRX parameter configuration that are associated with the G-CS-RNTI are not configured.

If the network configures, through the RRC signaling, a HARQ feedback enable/disable (HARQ enable/disable) corresponding to a certain G-CS-RNTI to be controlled through DCI (i.e. the RRC signaling carries the second indication information, and the second indication information indicates that whether the HARQ feedback is enabled or disabled is controlled by the DCI), then the DRX retransmission timer and the DRX RTT timer in the DRX parameter configuration associated with the G-CS-RNTI need to be configured.

3. In case that the network configures, through the RRC signaling, that a HARQ enable/disable corresponding to a certain G-CS-RNTI is controlled by the DCI, the terminal device receives the DCI.

Option 1: if the DCI is used for MBS SPS activation, the DCI used for MBS SPS activation carries the HARQ enable/disable indication information (i.e. the first indication information). If the DCI schedules retransmission, then the retransmission scheduling DCI scrambled by G-CS-RNTI does not carry the HARQ enable/disable indication information. By default, the HARQ enable/disable indication information given by the DCI for retransmission and that for the DCI used for MBS SPS activation are the same.

Option 2: both the DCI used for MBS SPS activation and the retransmission scheduling DCI scrambled by G-CS-RNTI carry the HARQ enable/disable indication information. For the same HARQ process, the HARQ enable/disable instruction information given in the retransmission scheduling DCI and the HARQ enable/disable instruction information given in the DCI for activating MBS SPS are the same. For example, the HARQ enable/disable indication information in the DCI for activating MBS SPS and the HARQ enable/disable indication information in the retransmission scheduling DCI scrambled by G-CS-RNTI both indicate that the HARQ feedback is enabled.

Option 3: both the DCI used for MBS SPS activation and the retransmission scheduling DCI scrambled by G-CS-RNTI carry the HARQ enable/disable indication information. If the HARQ enable/disable indication information in the DCI for activating MBS SPS indicates that the HARQ feedback is enabled, then the HARQ enable/disable indication information in the retransmission scheduling DCI scrambled by G-CS-RNTI indicates that the HARQ feedback is disabled.

4. If the DCI indicates that the HARQ feedback is disabled, then: 1) in case that the DRX retransmission timer and the DRX RTT timer run, the terminal device stops the DRX retransmission timer and the DRX RTT timer; or, 2) in case that the DRX retransmission timer and the DRX RTT timer do not run, the terminal device does not start the DRX retransmission timer and the DRX RTT timer. Here, the DRX retransmission timer and the DRX RTT timer refer to the retransmission timer and RTT timer that are associated with the above G-CS-RNTI.

In the technical solution of embodiments of the present disclosure, it is clear that in the MBS service receiving process, the HARQ feedback is semi-statically enabled or disabled by RRC signaling, or the HARQ feedback is dynamically enabled or disabled by DCI, so that the MBS service may well support the HARQ feedback. It is further clear how HARQ feedback enable/disable affects the configuration of DRX parameters and how it affects the operation of the DRX timer.

Preferred embodiments of the present disclosure are described in detail in conjunction with the accompanying drawings. However, the present disclosure is not limited to the specific details of the above implementations. Within the scope of the technical conception of the present disclosure, various simple modifications may be made to the technical solution of the present disclosure, and these simple modifications all belong to the scope of protection of the present disclosure. For example, each of the specific technical features described in the above specific implementations may be combined in any suitable manner without contradiction, and various possible combinations are not further described in the present disclosure in order to avoid unnecessary repetition. For another example, various different implementations of the present disclosure may be arbitrarily combined, so long as it does not depart from the idea of the present disclosure and it should also be considered as the content of the present disclosure. For another example, provided that there is no conflict, the various embodiments described in the present disclosure and/or the technical features in each embodiment may be arbitrarily combined with related art, and the resulting technical solution should also fall within the scope of protection of the present disclosure.

It should also be understood that in various method embodiments of the present disclosure, the size of the sequence number of the above processes does not mean the order of execution, and the execution order of each process should be determined according to its function and inherent logic, and should not constitute any limitation on the implementation of embodiments of the present disclosure. Further, in embodiments of the present disclosure, the terms "downlink", "uplink" and "sidelink" are used to represent the transmission direction of the signal or data, herein "downlink" is used to represent that the transmission direction of the signal or data is a first direction sent from a site to a user device of a cell, "uplink" is used to represent that the transmission direction of the signal or data is a second direction sent from the user device of the cell to the site, and "sidelink" is used to represent that the transmission direction of the signal or data is a third direction sent from a user device 1 to a user device 2. For example, "downlink signal" represents that the transmission direction of the signal is the first direction. In addition, in embodiments of the present disclosure, the term "and/or" is only an association relationship describing associated objects and represents that three relationships may exist. Specifically, A and/or B may represent three conditions: i.e., independent existence of A, existence of both A and B and independent existence of B. In addition, character "/" in the present disclosure usually represents that previous and next associated objects form an "or" relationship.

Figure 4:
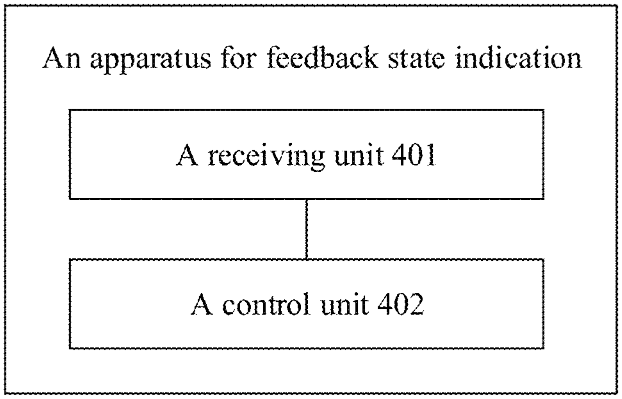
FIG. 4 is a first structural composition diagram of an apparatus for feedback state indication provided by an embodiment of the present disclosure.

FIG. 4 is a first structural composition diagram of an apparatus for feedback state indication provided by an embodiment of the present disclosure, which is applied to a terminal device. As shown in FIG. 4, the apparatus for feedback state indication includes:

A receiving unit 401, which is configured to receive a RRC signaling sent by a network device, the RRC signaling carrying first indication information or second indication information, herein, the first indication information indicates whether a HARQ feedback is enabled or disabled; and the second indication information indicates that whether the HARQ feedback is enabled or disabled is controlled by DCI.

In some exemplary implementations, the HARQ feedback is the HARQ feedback corresponding to G-RNTI.

In some exemplary implementations, when the RRC signaling carries the first indication information and the first indication information indicates that the HARQ feedback is disabled, a discontinuous reception (DRX) retransmission timer and a DRX round trip time (RTT) timer which are associated with the G-RNTI do not need to be configured.

In some exemplary implementations, when the RRC signaling carries the second indication information, or when the RRC signaling carries the first indication information and the first indication information indicates that the HARQ feedback is enabled, the DRX retransmission timer and the DRX RTT timer which are associated with the G-RNTI need to be configured.

In some exemplary implementations, in case that the RRC signaling carries the second indication information, the receiving unit 401 is further configured to receive the DCI sent by the network device, and the DCI is used to control whether a HARQ feedback is enabled or disabled.

In some exemplary implementations, the DCI is new transmission scheduling DCI scrambled by the G-RNTI, the new transmission scheduling DCI carries first indication information, and the first indication information is used for indicating whether the HARQ feedback is enabled or disabled.

In some exemplary implementations, the DCI is retransmission scheduling DCI scrambled by the G-RNTI, the retransmission scheduling DCI does not carry first indication information, and a HARQ feedback state corresponding to the retransmission scheduling DCI is determined based on first indication information in new transmission scheduling DCI associated with the retransmission scheduling DCI; or, the retransmission scheduling DCI carries the first indication information, and the first indication information is used for indicating whether the HARQ feedback is enabled or disabled.

In some exemplary implementations, a HARQ feedback state indicated by the first indication information in the new transmission scheduling DCI having correspondences and a HARQ feedback state indicated by first indication information in retransmission schedule DCI are the same.

In some exemplary implementations, the HARQ feedback state indicated by the first indication information in the new transmission scheduling DCI having correspondences and the HARQ feedback state indicated by the first indication information in the retransmission schedule DCI are different.

In some exemplary implementations, the first indication information in the new transmission scheduling DCI indicates that the HARQ feedback is enabled, and the first indication information in the retransmission schedule DCI associated with the new transmission scheduling DCI indicates that the HARQ feedback is disabled.

In some exemplary implementations, the apparatus further includes: a control unit 402, which is configured to, when it is determined that the HARQ feedback is disabled, stop or not start the DRX RTT timer and the DRX retransmission timer which are associated with the G-RNTI.

In some exemplary implementations, the HARQ feedback is the HARQ feedback corresponding to G-CS-RNTI.

In some exemplary implementations, when the RRC signaling carries the first indication information and the first indication information indicates that the HARQ feedback is disabled, a DRX retransmission timer and a DRX RTT timer that are associated with the G-CS-RNTI do not need to be configured.

In some exemplary implementations, when the RRC signaling carries the second indication information, or when the RRC signaling carries the first indication information and the first indication information indicates that the HARQ feedback is enabled, the DRX retransmission timer and the DRX RTT timer that are associated with the G-CS-RNTI need to be configured.

In some exemplary implementations, in case that the RRC signaling carries the second indication information, the receiving unit 401 is further configured to receive the DCI sent by the network device, and the DCI is used to control whether a HARQ feedback is enabled or disabled.

In some exemplary implementations, the DCI is DCI for MBS SPS activation scrambled by the G-CS-RNTI, the DCI for MBS SPS activation carries first indication information, and the first indication information is used for indicating whether the HARQ feedback is enabled or disabled.

In some exemplary implementations, the DCI is retransmission scheduling DCI scrambled by the G-CS-RNTI, the retransmission scheduling DCI does not carry first indication information, and a HARQ feedback state corresponding to the retransmission scheduling DCI is determined based on first indication information in DCI for MBS SPS activation; or, the retransmission scheduling DCI carries the first indication information, and the first indication information is used for indicating whether the HARQ feedback is enabled or disabled.

In some exemplary implementations, a HARQ feedback state indicated by the first indication information in the DCI for MBS SPS activation and a HARQ feedback state indicated by first indication information in retransmission schedule DCI are the same.

In some exemplary implementations, the HARQ feedback state indicated by the first indication information in the DCI for MBS SPS activation and the HARQ feedback state indicated by the first indication information in the retransmission schedule DCI are different.

In some exemplary implementations, the first indication information in the DCI for MBS SPS activation indicates that the HARQ feedback is enabled, and the first indication information in the retransmission schedule DCI indicates that the HARQ feedback is disabled.

In some exemplary implementations, the apparatus further includes: a control unit 402, which is configured to, when it is determined that the HARQ feedback is disabled, stop or not start the DRX RTT timer and the DRX retransmission timer that are associated with the G-CS-RNTI.

Those skilled in the art should understand that the relevant description of the above apparatus for indicating the feedback state in embodiments of the present disclosure may be understood by referring to the relevant description of the method for indicating the feedback state in embodiments of the present disclosure.

Figure 5:
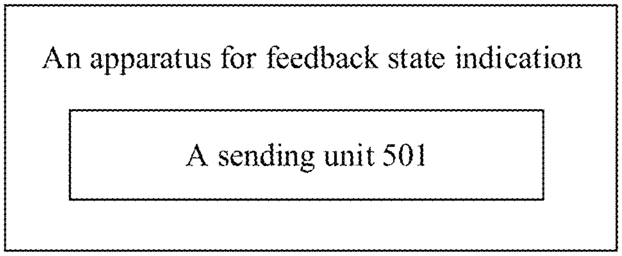
FIG. 5 is a second structural composition diagram of an apparatus for feedback state indication provided by an embodiment of the present disclosure.

FIG. 5 is a second structural composition diagram of an apparatus for feedback state indication provided by an embodiment of the present disclosure, which is applied to a network device. As shown in FIG. 5, the apparatus for feedback state indication includes:

a sending unit 501, which is configured to send a RRC signaling to a terminal device, the RRC signaling carrying first indication information or second indication information, herein, the first indication information indicates whether a HARQ feedback is enabled or disabled; and the second indication information indicates that whether the HARQ feedback is enabled or disabled is controlled by DCI.

In some exemplary implementations, the HARQ feedback is the HARQ feedback corresponding to G-RNTI.

In some exemplary implementations, when the RRC signaling carries the first indication information and the first indication information indicates that the HARQ feedback is disabled, a DRX retransmission timer and a DRX RTT timer which are associated with the G-RNTI do not need to be configured.

In some exemplary implementations, when the RRC signaling carries the second indication information, or when the RRC signaling carries the first indication information and the first indication information indicates that the HARQ feedback is enabled, the DRX retransmission timer and the DRX RTT timer which are associated with the G-RNTI need to be configured.

In some exemplary implementations, in case that the RRC signaling carries the second indication information, the sending unit 501 is further configured to send the DCI to the terminal device, and the DCI is used to control whether a HARQ feedback is enabled or disabled.

In some exemplary implementations, the DCI is new transmission scheduling DCI scrambled by the G-RNTI, the new transmission scheduling DCI carries first indication information, and the first indication information is used for indicating whether the HARQ feedback is enabled or disabled.

In some exemplary implementations, the DCI is retransmission scheduling DCI scrambled by the G-RNTI, the retransmission scheduling DCI does not carry first indication information, and a HARQ feedback state corresponding to the retransmission scheduling DCI is determined based on first indication information in new transmission scheduling DCI associated with the retransmission scheduling DCI; or, the retransmission scheduling DCI carries the first indication information, and the first indication information is used for indicating whether the HARQ feedback is enabled or disabled.

In some exemplary implementations, a HARQ feedback state indicated by the first indication information in the new transmission scheduling DCI having correspondences and a HARQ feedback state indicated by first indication information in retransmission schedule DCI are the same.

In some exemplary implementations, the HARQ feedback state indicated by the first indication information in the new transmission scheduling DCI having correspondences and the HARQ feedback state indicated by the first indication information in the retransmission schedule DCI are different.

In some exemplary implementations, the first indication information in the new transmission scheduling DCI indicates that the HARQ feedback is enabled, and the first indication information in the retransmission schedule DCI associated with the new transmission scheduling DCI indicates that the HARQ feedback is disabled.

In some exemplary implementations, the HARQ feedback is the HARQ feedback corresponding to G-CS-RNTI.

In some exemplary implementations, when the RRC signaling carries the first indication information and the first indication information indicates that the HARQ feedback is disabled, a DRX retransmission timer and a DRX RTT timer that are associated with the G-CS-RNTI do not need to be configured.

In some exemplary implementations, when the RRC signaling carries the second indication information, or when the RRC signaling carries the first indication information and the first indication information indicates that the HARQ feedback is enabled, the DRX retransmission timer and the DRX RTT timer that are associated with the G-CS-RNTI need to be configured.

In some exemplary implementations, in case that the RRC signaling carries the second indication information, the sending unit 501 is further configured to send the DCI to the terminal device, and the DCI is used to control whether a HARQ feedback is enabled or disabled.

In some exemplary implementations, the DCI is DCI for MBS SPS activation scrambled by the G-CS-RNTI, the DCI for MBS SPS activation carries first indication information, and the first indication information is used for indicating whether the HARQ feedback is enabled or disabled.

In some exemplary implementations, the DCI is retransmission scheduling DCI scrambled by the G-CS-RNTI, the retransmission scheduling DCI does not carry first indication information, and a HARQ feedback state corresponding to the retransmission scheduling DCI is determined based on first indication information in DCI for MBS SPS activation; or, the retransmission scheduling DCI carries the first indication information, and the first indication information is used for indicating whether the HARQ feedback is enabled or disabled.

In some exemplary implementations, a HARQ feedback state indicated by the first indication information in the DCI for MBS SPS activation and a HARQ feedback state indicated by first indication information in retransmission schedule DCI are the same.

In some exemplary implementations, the HARQ feedback state indicated by the first indication information in the DCI for MBS SPS activation and the HARQ feedback state indicated by the first indication information in the retransmission schedule DCI are different.

In some exemplary implementations, the first indication information in the DCI for MBS SPS activation indicates that the HARQ feedback is enabled, and the first indication information in the retransmission schedule DCI indicates that the HARQ feedback is disabled.

Those skilled in the art should understand that the relevant description of the above apparatus for feedback state indication in embodiments of the present disclosure may be understood by referring to the relevant description of the method for feedback state indication in embodiments of the present disclosure.

Figure 6:
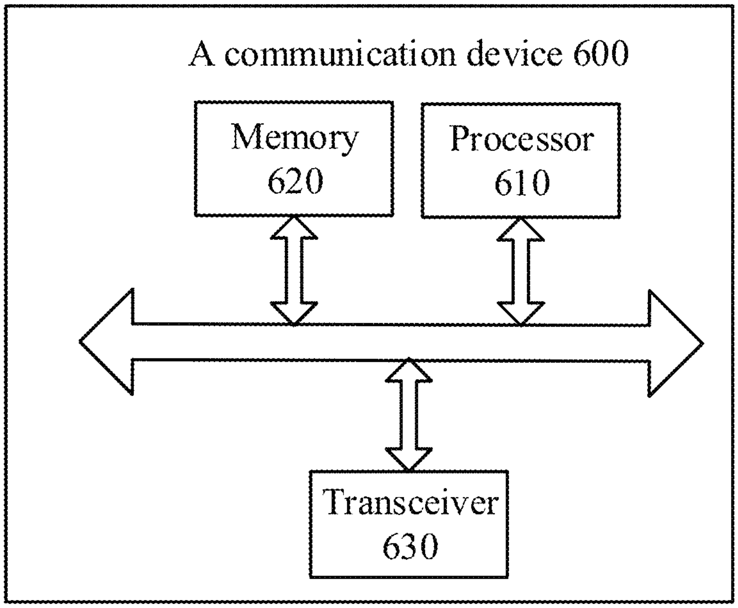
FIG. 6 is a schematic structural diagram of a communication device provided by an embodiment of the present disclosure.

FIG. 6 is a schematic structural diagram of a communication device 600 provided by an embodiment of the present disclosure. The communication device may be a terminal device or a network device. The communication device 600 shown in FIG. 6 includes a processor 610, and the processor 610 may invoke and run a computer program from a memory to implement the method in embodiments of the present disclosure.

In an example, as shown in FIG. 6, the communication device 600 may further include a memory 620. Herein, the processor 610 may invoke and run a computer program from the memory 620 to implement the method in embodiments of the present disclosure.

Herein, the memory 620 may be a separate device independent of the processor 610, or may be integrated into the processor 610.

Optionally, as shown in FIG. 6, the communication device 600 may further include a transceiver 630, the processor 610 may control the transceiver 630 to communicate with other devices, and in particular, may send information or data to other devices, or receive information or data sent from other devices.

Herein, the transceiver 630 may include a transmitter and a receiver. The transceiver 630 may further include antennas, the number of which may be one or more.

Optionally, the communication device 600 may specifically be the network device of embodiments of the present disclosure, and the communication device 600 may implement the corresponding flows implemented by the network device in various methods of embodiments of the present disclosure, and will not be repeated here for the sake of brevity.

Optionally, the communication device 600 may specifically be the mobile terminal/terminal device of embodiments of the present disclosure, and the communication device 600 may implement the corresponding flows implemented by the mobile terminal/terminal device in various methods of embodiments of the present disclosure, and will not be repeated here for the sake of brevity.

Figure 7:
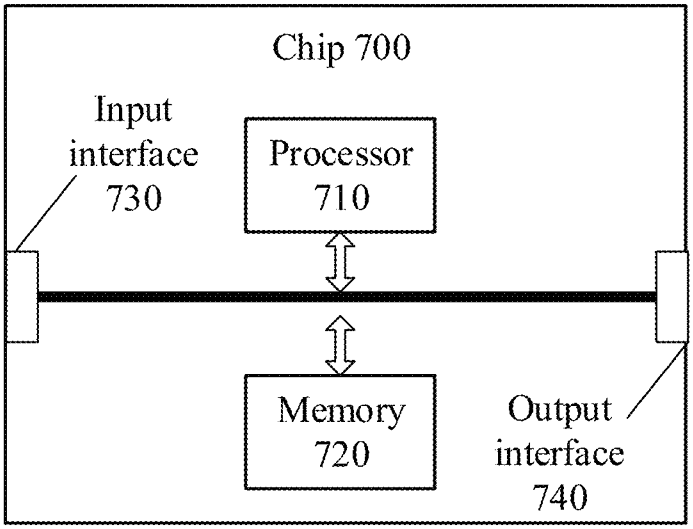
FIG. 7 is a schematic structural diagram of a chip of an embodiment of the present disclosure.

FIG. 7 is a schematic structural diagram of a chip of an embodiment of the present disclosure. The chip 700 shown in FIG. 7 includes a processor 710, and the processor 710 may invoke and run a computer program from a memory to implement the method in embodiments of the present disclosure.

Optionally, as shown in FIG. 7, the chip 700 may further include a memory 720. Herein, the processor 710 may invoke and run a computer program from the memory 720 to implement the method in embodiments of the present disclosure.

Herein, the memory 720 may be a separate device independent of the processor 710, or may be integrated into the processor 710.

Optionally, the chip 700 may further include an input interface 730. Herein, the processor 710 may control the input interface 730 to communicate with other devices or chips, and in particular, may acquire information or data sent from other devices or chips.

Optionally, the chip 700 may further include an output interface 740. Herein, the processor 710 may control the output interface 740 to communicate with other devices or chips, and in particular, may output information or data to other devices or chips.

Optionally, the chip may be applied to the network device of embodiments of the present disclosure, and the chip may implement the corresponding flows implemented by the network device in various methods of embodiments of the present disclosure, and will not repeated herein for the sake of brevity.

Optionally, the chip may be applied to the mobile terminal/terminal device of embodiments of the present disclosure, and the chip may implement the corresponding flows implemented by the mobile terminal/terminal device in various methods of embodiments of the present disclosure, and will not repeated herein for the sake of brevity.

It should be understood that the chip referred to in embodiments of the present disclosure may also be referred to as a system level chip, a system on chip, a chip system, or a system on a chip, etc.

Figure 8:
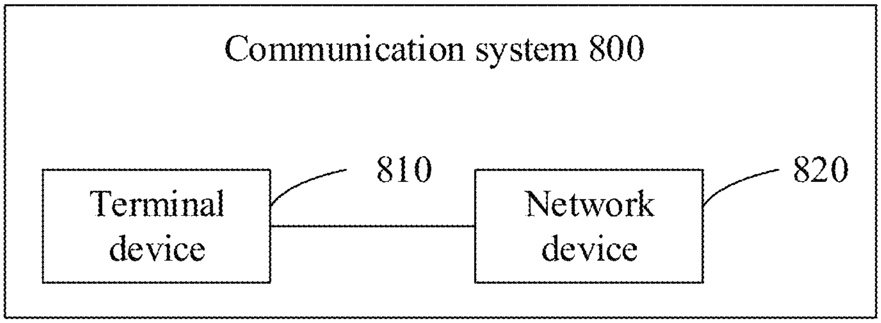
FIG. 8 is a schematic block diagram of a communication system provided by an embodiment of the present disclosure.

FIG. 8 is a schematic block diagram of a communication system 800 provided by an embodiment of the present disclosure. As shown in FIG. 8, the communication system 800 includes a terminal device 810 and a network device 820.

Herein, the terminal device 810 may be used to implement the corresponding functions implemented by the terminal device in the above method, and the network device 820 may be used to implement the corresponding functions implemented by the network device in the above method, and will not be repeated herein for the sake of brevity.

It should be understood that the processor of embodiments of the present disclosure may be an integrated circuit chip with signal processing capability. In implementation, the respective steps of the above method embodiments may be accomplished by integrated logic circuits of hardware in the processor or by instructions in the form of software. The above processor may be a general purpose processor, a digital signal processor (DSP), an application specific integrated circuit (ASIC), a field programmable gate array (FPGA) or other programmable logic devices, a discrete gate or a transistor logic device, a discrete hardware component. The various methods, steps and logic diagrams disclosed in embodiments of the present disclosure may be implemented or performed. The general purpose processor may be a microprocessor, or the processor may be any conventional processor or the like. The steps of the method disclosed in combination with embodiments of the present disclosure may be directly embodied as being performed by a hardware decoding processor or a combination of the hardware and software modules in the decoding processor. The software module may be located in random access memory (RAM), flash memory, read-only memory (ROM), programmable ROM (PROM), or electrically erasable programmable memory, registers and other storage medium mature in the art. The storage medium is located in the memory, and the processor reads the information in the memory and completes the steps in the above methods in conjunction with its hardware.

It can be understood that the memory in embodiments of the present disclosure may be volatile memory or nonvolatile memory or may include both volatile and nonvolatile memory. Herein, the nonvolatile memory may be ROM, PROM, erasable PROM (EPROM), electrically EPROM (EEPROM), or flash memory. The volatile memory may be a random access memory (RAM) which serves as an external cache. By way of illustration, but not limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), and direct rambus RAM (DR RAM). It should be noted that the memory of the system and method described in the present disclosure is intended to include but not to limit these and any other suitable types of memory.

It should be understood that the memory described above is exemplary, but not limiting. For example, the memory in embodiments of the present disclosure may also be SRAM, DRAM, SDRAM, DDR SDRAM, ESDRAM, SLDRAM, and DR RAM, etc. That is to say, the memory in embodiments of the present disclosure is intended to include but not to limit these and any other suitable types of memory.

Embodiments of the present disclosure also provide a computer-readable storage medium for storing computer programs.

Optionally, the computer-readable storage medium may be applied to the network device in embodiments of the present disclosure, and the computer program causes a computer to perform the corresponding flows implemented by the network device in various methods of embodiments of the present disclosure, and will not repeated herein for the sake of brevity.

Optionally, the computer-readable storage medium may be applied to the mobile terminal/terminal device in embodiments of the present disclosure, and the computer program causes the computer to perform the corresponding flows implemented by the mobile terminal/terminal device in various methods of embodiments of the present disclosure, and will not repeated herein for the sake of brevity.

Embodiments of the present disclosure further provide a computer program product, which includes computer program instructions.

Optionally, the computer program product may be applied to the network device in embodiments of the present disclosure, and the computer program instructions cause the computer to perform the corresponding flows implemented by the network device in various methods of embodiments of the present disclosure, and will not repeated herein for the sake of brevity.

Optionally, the computer program product may be applied to the mobile terminal/terminal device in embodiments of the present disclosure, and the computer program instructions cause the computer to perform the corresponding flows implemented by the mobile terminal/terminal device in various methods of embodiments of the present disclosure, and will not repeated herein for the sake of brevity.

Embodiments of the present disclosure further provide a computer program.

Optionally, the computer program may be applied to the network device in embodiments of the present disclosure, and when running on the computer, the computer program causes the computer to perform the corresponding flows implemented by the network device in various methods of embodiments of the present disclosure, and will not repeated herein for the sake of brevity.

Optionally, the computer program may be applied to the mobile terminal/terminal device in embodiments of the present disclosure, and when running on the computer, the computer program causes the computer to perform the corresponding flows implemented by the mobile terminal/terminal device in various methods of embodiments of the present disclosure, and will not repeated herein for the sake of brevity.

Those skilled in the art will appreciate that the various example units and algorithm steps described in conjunction with embodiments disclosed in the present disclosure can be implemented in electronic hardware or a combination of computer software and electronic hardware. Whether these functions are performed in the hardware or software form depends on the specific application and design constraints of the technical solution. Those skilled in the art may use different methods for each particular application to implement the described function, but such implementation should not be considered beyond the scope of the present disclosure.

Those skilled in the art will clearly appreciate that, for convenience and brevity of description, specific operating processes of the above-described systems, apparatuses, and units may refer to corresponding processes in the foregoing method embodiments, and will not be repeated herein.

In several embodiments provided by the present disclosure, it should be understood that the disclosed systems, apparatuses and methods may be implemented in other ways. For example, the above-described apparatus embodiments are only exemplary. For example, the partition of units is only a logical functional partition, which may be implemented in another way, for example, multiple units or components may be combined or integrated into another system, or some features may be ignored or not performed. On the other hand, the coupling, direct coupling or communication connection between each other shown or discussed above may be indirect coupling or communication connection through some interfaces, devices or units, and may be electrical, mechanical or other form.

The units illustrated as separate components may or may not be physically separated, and components displayed as units may or may not be physical units, i.e. may be located in one place, or may be distributed over multiple network units. Some or all of the units may be selected according to actual needs to achieve the object of embodiments of the present disclosure.

In addition, each functional unit in each embodiment of the present disclosure may be integrated in one processing unit, each unit may exist physically alone, or two or more units may be integrated in one unit.

The functions may be stored in a computer readable storage medium if implemented in the form of software functional units and sold or used as independent products. Based on such understanding, the technical solution of the present disclosure, in essence or a part contributing to the prior art, or a part of the technical solution, may be embodied in the form of a software product. The computer program product is stored in a storage medium and includes several instructions for causing a computer device (which may be a personal computer, server, or network device, etc.) to perform all or part of the steps of the method of respective embodiments of the present disclosure. The aforementioned storage medium includes various mediums capable of storing program codes such as U disk, mobile hard disk, ROM, RAM, magnetic disk or optical disk.

The above-mentioned is only the specific implementation of the present disclosure, but the scope of protection of the present disclosure is not limited thereto. Any changes or substitutions may be easily think of by those skilled familiar with the art within the technical scope disclosed by the present disclosure, should be covered within the scope of protection of the present disclosure. Therefore, the scope of protection of the present disclosure shall be subject to the scope of protection of the claims.

What is claimed is:

1. A method for feedback state indication, comprising:

receiving, by a terminal device, a radio resource control (RRC) signaling sent by a network device, the RRC signaling carrying second indication information, wherein the second indication information indicates that whether a Hybrid Automatic Repeat reQuest (HARQ) feedback is enabled or disabled is controlled by downlink control information (DCI), the HARQ feedback is a HARQ feedback corresponding to a group configuration scheduling radio network temporary identity (G-CS-RNTI), a discontinuous reception (DRX) retransmission timer and a DRX round trip time (RTT) timer that are associated with the G-CS-RNTI are configured, wherein the method further comprises: receiving, by the terminal device, DCI sent by the network device, wherein the DCI comprises DCI for multimedia broadcast service (MBS) semi persistent scheduling (SPS) activation scrambled by the G-CS-RNTI, the DCI for MBS SPS activation carries first indication information, and the first indication information is used for indicating whether the HARQ feedback is enabled or disabled.

2. The method of claim 1, wherein the DCI further comprises retransmission scheduling DCI scrambled by the G-CS-RNTI, the retransmission scheduling DCI does not carry first indication information, and a HARQ feedback state corresponding to the retransmission scheduling DCI is determined based on the first indication information in the DCI for MBS SPS activation; or, the retransmission scheduling DCI carries first indication information, and the first indication information in the retransmission scheduling DCI is used for indicating whether the HARQ feedback is enabled or disabled.

3. The method of claim 2, wherein a HARQ feedback state indicated by the first indication information in the DCI for MBS SPS activation and a HARQ feedback state indicated by the first indication information in the retransmission scheduling DCI are the same.

4. The method of claim 2, wherein a HARQ feedback state indicated by the first indication information in the DCI for MBS SPS activation and a HARQ feedback state indicated by the first indication information in the retransmission scheduling DCI are different.

5. The method of claim 4, wherein the first indication information in the DCI for MBS SPS activation indicates that the HARQ feedback is enabled, and the first indication information in the retransmission schedule DCI indicates that the HARQ feedback is disabled.

6. The method of claim 1, further comprising:

when the terminal device determines that the HARQ feedback is disabled, stopping or not starting, by the terminal device, the DRX RTT timer and the DRX retransmission timer that are associated with the G-CS-RNTI.

7. The method of claim 6, wherein the stopping or not starting, by the terminal device, the DRX RTT timer and the DRX retransmission timer that are associated with the G-CS-RNTI comprises:

in a case that the DRX RTT timer and the DRX retransmission timer are running, stopping, by the terminal device, the DRX RTT timer and the DRX retransmission timer; or in a case that the DRX RTT timer and the DRX retransmission timer are not running, not starting, by the terminal device, the DRX RTT timer and the DRX retransmission timer.

8. The method of claim 1, wherein the DRX retransmission timer associated with the G-CS-RNTI is a retransmission timer used for MBS services, the DRX RTT timer associated with the G-CS-RNTI is a DRX RTT timer used for MBS services, and the MBS services are semi persistent scheduled through G-CS-RNTI.

9. The method of claim 1, wherein the RRC signaling is further used to configure configuration information for MBS service transmission for the terminal device, wherein the configuration information comprises temporary mobile group identity (TMGI), MBS SPS, G-CS-RNTI, common frequency domain positions for MBS reception, HARQ feedback mode, and data transmission architecture mode.

10. The method of claim 9, wherein the HARQ feedback mode comprises a negative acknowledgment (NACK) only based HARQ feedback mode, or an acknowledgment (ACK)/NACK based HARQ feedback mode, and the data transmission architecture mode comprises a protocol stack mode of packet data convergence protocol (PDCP) anchor, and the data architecture transmission mode of point-to-point (PTP) for point-to-multipoint (PTM) retransmission.

11. A terminal device, comprising: a processor and a memory, wherein the memory is configured to store a computer program; and the processor is configured to invoke and run the computer program stored in the memory to control the terminal device to:

receive a radio resource control (RRC) signaling sent by a network device, the RRC signaling carrying second indication information, wherein the second indication information indicates that whether a Hybrid Automatic Repeat reQuest (HARQ) feedback is enabled or disabled is controlled by downlink control information (DCI), the HARQ feedback is a HARQ feedback corresponding to a group configuration scheduling radio network temporary identity (G-CS-RNTI), a discontinuous reception (DRX) retransmission timer and a DRX round trip time (RTT) timer that are associated with the G-CS-RNTI are configured, wherein the method further comprises: receiving, by the terminal device, DCI sent by the network device, wherein the DCI comprises DCI for multimedia broadcast service (MBS) semi persistent scheduling (SPS) activation scrambled by the G-CS-RNTI, the DCI for MBS SPS activation carries first indication information, and the first indication information is used for indicating whether the HARQ feedback is enabled or disabled.

12. The terminal device of claim 11, wherein the DCI further comprises retransmission scheduling DCI scrambled by the G-CS-RNTI, the retransmission scheduling DCI does not carry first indication information, and a HARQ feedback state corresponding to the retransmission scheduling DCI is determined based on the first indication information in the DCI for MBS SPS activation; or, the retransmission scheduling DCI carries first indication information, and the first indication information in the retransmission scheduling DCI is used for indicating whether the HARQ feedback is enabled or disabled.

13. The terminal device of claim 12, wherein a HARQ feedback state indicated by the first indication information in the DCI for MBS SPS activation and a HARQ feedback state indicated by the first indication information in the retransmission scheduling DCI are the same.

14. The terminal device of claim 12, wherein a HARQ feedback state indicated by the first indication information in the DCI for MBS SPS activation and a HARQ feedback state indicated by the first indication information in the retransmission scheduling DCI are different.

15. The terminal device of claim 14, wherein the first indication information in the DCI for MBS SPS activation indicates that the HARQ feedback is enabled, and the first indication information in the retransmission schedule DCI indicates that the HARQ feedback is disabled.

16. The terminal device of claim 11, wherein the processor is further configured to invoke and run the computer program stored in the memory to control the terminal device to:

when the terminal device determines that the HARQ feedback is disabled, stop or not start the DRX RTT timer and the DRX retransmission timer that are associated with the G-CS-RNTI.

17. The terminal device of claim 11, wherein the DRX retransmission timer associated with the G-CS-RNTI is a retransmission timer used for MBS services, the DRX RTT timer associated with the G-CS-RNTI is a DRX RTT timer used for MBS services, and the MBS services are semi persistent scheduled through G-CS-RNTI.

18. The terminal device of claim 11, wherein the RRC signaling is further used to configure configuration information for MBS service transmission for the terminal device, wherein the configuration information comprises temporary mobile group identity (TMGI), MBS SPS, G-CS-RNTI, common frequency domain positions for MBS reception, HARQ feedback mode, and data transmission architecture mode.

19. The terminal device of claim 18, wherein the HARQ feedback mode comprises a negative acknowledgment (NACK) only based HARQ feedback mode, or an acknowledgment (ACK)/NACK based HARQ feedback mode, and the data transmission architecture mode comprises a protocol stack mode of packet data convergence protocol (PDCP) anchor, and the data architecture transmission mode of point-to-point (PTP) for point-to-multipoint (PTM) retransmission.

20. A network device, comprising: a processor and a memory, wherein the memory is configured to store a computer program; and the processor is configured to invoke and run the computer program stored in the memory to control the network device to:

send a radio resource control (RRC) signaling to a terminal device, the RRC signaling carrying second indication information, wherein the second indication information indicates that whether a Hybrid Automatic Repeat reQuest (HARQ) feedback is enabled or disabled is controlled by downlink control information (DCI), the HARQ feedback is a HARQ feedback corresponding to a group configuration scheduling radio network temporary identity (G-CS-RNTI), a discontinuous reception (DRX) retransmission timer and a DRX round trip time (RTT) timer that are associated with the G-CS-RNTI are configured, wherein the method further comprises: receiving, by the terminal device, DCI sent by the network device, wherein the DCI comprises DCI for multimedia broadcast service (MBS) semi persistent scheduling (SPS) activation scrambled by the G-CS-RNTI, the DCI for MBS SPS activation carries first indication information, and the first indication information is used for indicating whether the HARQ feedback is enabled or disabled.

* * * * *